United States Patent [19]
Watanabe

[11] 3,723,020
[45] Mar. 27, 1973

[54] APPARATUS FOR TRANSFERRING HIGHLY VISCOUS MATERIAL

[76] Inventor: Makoto Watanabe, 1070-4, Oaza-Shiba, Kawaguchi, Saitama, Japan

[22] Filed: Mar. 17, 1971

[21] Appl. No.: 125,199

[52] U.S. Cl. .................................................415/72
[51] Int. Cl. ...........................................F01d 5/00
[58] Field of Search..................................415/72

[56] References Cited

UNITED STATES PATENTS

| | | | |
|---|---|---|---|
| 1,778,589 | 10/1930 | Eerkes | 415/72 |
| 1,519,664 | 12/1924 | Campbell | 415/72 |
| 2,045,757 | 6/1936 | Constantin | 415/72 |
| 3,173,584 | 3/1965 | Giauasis | 415/72 |

Primary Examiner—C. J. Husar
Attorney—Linton & Linton

[57] ABSTRACT

Transfer of highly viscous material can be effected easily by the use of a simple-structured transferring apparatus comprising: a tubular casing having a closed top, a feed introduction port of an inverted funnel shape formed integrally at the bottom of said casing and a delivery outlet formed through the upper side wall of said casing; a rotatable shaft extending through said casing beyond both ends thereof; at least one raking vane fixed to said shaft at a position slightly beyond the end edge of said port and having a curved and twisted face; a helical guide vane fixed to said shaft in said funnel-shaped port at a position close to and above said raking vane; and a continuous helical feed vane provided on said shaft and joining said guide vane and extending along the shaft in said casing up to a position close to said closed top.

1 Claim, 3 Drawing Figures

PATENTED MAR 27 1973          3,723,020

INVENTOR.
MAKOTO WATANABE
BY
*Linton and Linton*
ATTORNEYS

APPARATUS FOR TRANSFERRING HIGHLY VISCOUS MATERIAL

BACKGROUND OF THE INVENTION a. Field of the Invention

The present invention is concerned with a transferring apparatus for transferring flowable material, and more particularly, it relates to an apparatus for transferring highly viscous material.

b. Description of the Prior Art

Known apparatuses for transferring viscous materials include those which are of the vacuum type and those of the external pressure type. The vacuum type transferring apparatus is designed so that by lowering the pressure inside the tank, the material to be transferred is sucked into the suction inlet by utilizing the difference between the resulting inner pressure and the external atmospheric pressure. The external pressure type transferring apparatus, on the other hand, utilizes a pressure which is applied to the material contained in the tank from, for example, above thereof so that this pressure is transmitted to the inlet of the tank. These conventional transferring apparatuses, however, had the drawbacks that they required a large size and that the operation was complicated, and that, nevertheless, the result obtained was far from being satisfactory or from what was expected or desired to be.

It was impossible in the part to materialize continuous transfer — by the use of these transferring apparatuses of the prior art — of unusually highly viscous fluid materials of non-Newtonian flow property, such as printing ink, resins and those materials of particularly high viscosity which are used in chemical as well as food industries, or more specifically, those materials having a viscosity of 2,000 poise or more. Thus, materials of especially high viscosity could not be transferred continuously by the use of a known suction pump or vacuum pump — however great its suction force might be — unless the material was forced into the suction inlet by the application of an additional external force onto the inlet side, even when the suction pump was actuated continuously.

If a highly viscous material was sucked by utilizing only the vacuum force provided by the pump without the aforesaid application of an external pressure in a direction opposite to the suction force, the viscous material tended to be disintegrated into divided pieces and could not be sucked as a continuous body into the inlet, however high the degree of vacuum caused by the suction pump might be. Thus, the suction pump failed to attain its primary object. Accordingly, one was obliged to invert the container, though depending on its configuration and condition, or to divide the material into pieces of an appropriate size to handle them as if they were solid pieces. Thus, the operation undesirably tended to become low in efficiency.

It has so far been quite difficult to satisfactorily accomplish smooth transfer of highly concentrated viscous suspension by relying on known transferring means such as conventional suction pump or the like. Therefore, the practice which has been adopted in the past in this respect was to convey a highly viscous material in its state of being placed in a container and to scoop up an appropriate amount — like solid pieces of material — by the use of an instrument comprising a helve of a substantial length and a pallet-like scooping head secured to the forward end thereof and in such a manner that a portion of said helve is placed on one side edge of the container frame so as to have this helve serve as a lever on said side edge which, in turn, functions as a fulcrum, while utilizing the weight of the body of the operator to accomplish this scooping. Thus, the producing process was that of a very low efficiency and was far from being economical.

SUMMARY OF THE INVENTION

It is, therefore, an object of the present invention to eliminate the aforesaid drawbacks of the conventional apparatuses for transferring highly viscous materials and to provide an improved apparatus intended for the similar purpose and free of such drawbacks.

Another object of the present invention is to provide an improved apparatus of the type described for transferring highly viscous material, which is simple in structure and compact in size and which provides highly efficient operation.

Still another object of the present invention is to provide an improved apparatus of the type described for transferring highly viscous material, which utilizes the rotation of raking vanes, a helical guide vane and a helical continuous feed vane securely mounted on a common rotatable shaft housed in a casing and which is operable under atmospheric pressure and which does not rely on vacuum or external pressure.

BRIEF DESCRIPTION OF THE DRAWINGS

It is to be understood that like parts are indicated by like reference numerals in the drawings.

DETAILED DESCRIPTION OF THE PREFERRED EMBODIMENT

Figure 1:
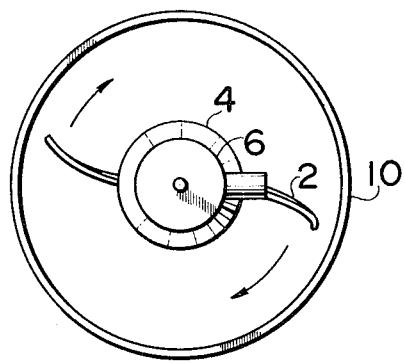
FIG. 1 is a somewhat diagrammatic plane view of the apparatus embodying the present invention.
Figure 3:
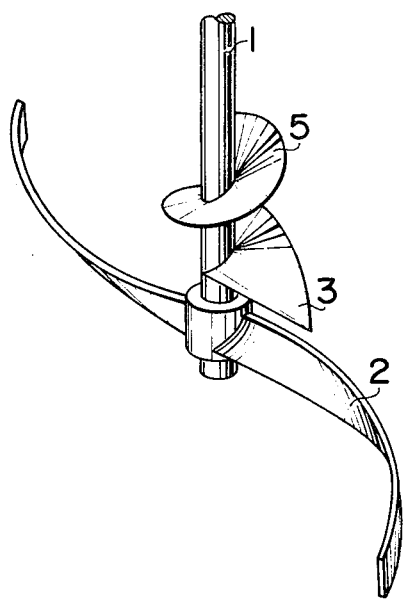
FIG. 3 is an explanatory perspective view, showing the state in which the raking vanes, a helical guide vane and a helical continuous feed vane are fixed to a rotatable shaft.
Figure 2:
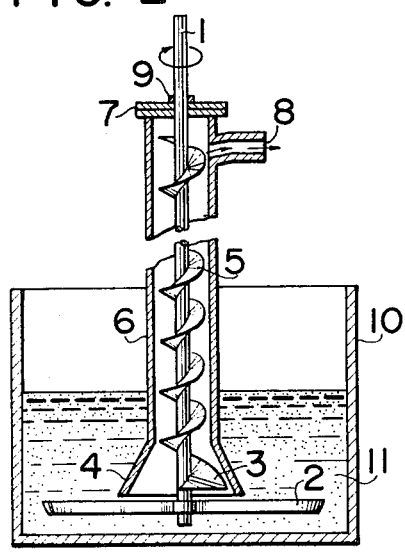
FIG. 2 is a somewhat diagrammatic side elevation, partly in section, of the same apparatus.

In the drawings, there is shown an example of the apparatus structure for transferring highly viscous material, which embodies the present invention.

Reference numeral 1 represents a rotatable shaft which is rotated from a driving means (not shown) after being reduced in the speed of rotation. Numeral 2 represents one of the pair of raking vanes fixed to said rotatable shaft 1 at a position slightly below the edge of the funnel-shaped port 4 which will be described later and each being provided with a curved and twisted face formed in the direction of rotation. Numeral 3 represents a helical guide vane fixed to said rotatable shaft 1 at a position immediately above said raking vanes 2. Numeral 4 represents an introduction port of an inverted funnel shape covering said guide vane 3. Numeral 5 represents a helical and continuous feed vane fixed to the rotatable shaft 1, joining said guide vane 3 and extending upwardly along the shaft 1. Numeral 6 represents a tubular casing covering the feed vanes 5. Numeral 7 represents a fluid blocking plate closing the top opening of the tubular casing. The upper portion of said shaft 1 extends through this plate 7 to be coupled to a driving means not shown. The free end of said helical feed vane 5 terminates close to the fluid blocking plate 7 comma adjacent the delivery outlet 8. Numeral 9 represents a bearing provided about the rotatable shaft on the upper face of the fluid blocking plate 7. Numeral 10 represents a container, and numeral 11 represents a material to be transferred which is placed in said container 10.

Description will next be directed to the operation of the apparatus having the aforesaid structure.

The apparatus of the present invention is inserted in the material 11 to be transferred which is contained in the container 10. Thereafter, the rotatable shaft 1 is rotated from a driving means not shown. Whereupon, the raking vanes 2 start rotation and, along therewith, they begin to rake the material 11 to be transfered. By virtue of the curved face of each raking vane 2, the material to be transferred is first raked toward the base of the raking vane 2. That portion of the material 11 which has been gathered to the central part below the bottom of the apparatus is then fed toward the introduction port a by the action of the twisted face of the raking vane 2. Whereupon, that portion of the material 11 located in the area corresponding to the rotating raking vanes 2 is forced to form a hollow cylindrical shape, and thereupon, those portions of the material 11 located thereabove tend to drop downwardly toward the bottom of the container 10 in accordance with Newton's law of gravitation. Thus, it becomes possible to effect continuous raking of the material 11 by the continuous rotation of the raking vanes 2. The material 11 which has been gathered to the introduction port 4 is then fed by the helical guide vanes 3 to the site at which the continuous helical feed vanes 5 begin. Therefrom, the material 11 is forced to travel upwardly by the continuous helical feed vanes 5. This ascension of the material 11 is blocked as it hits the fluid blocking plate 7. Accordingly, the material 11 is forced outside the tubular casing 6 through the delivery outlet 8.

The total diameter of the raking vanes 2 can vary depending on the viscosity of the material 11. This diameter should increase with an increase in the viscosity and should decrease in accordance with a decrease in the viscosity of of the material 11. It should be noted that, as this apparatus is started, the material 11 having a low viscosity tends to gather centrally. On the other hand, the material 11 having a high viscosity tends to be scraped by the raking vanes 2 at the portions of the material 11 contacted by the raking vanes 2. These scraped portions of the material 11 are gathered to the central bottom part of the apparatus by virtue of the curves and the twists formed on the faces of these raking vanes 2.

As said portions of the material 11 to be transferred are gathered to said central part, the material will have a hollow cylindrical region in said scraped or raked portions. Accordingly, the portions of the material 11 located adjacent and above said hollow portions will be caused to drop downwardly by their own gravity to fill the hollow area, thus entering into the range of operation of the raking vanes 2. Thus, the state of transfer of the material continues smoothly.

It should be understood also that the inner diameter of the tubular casing 6 and that of the feed vanes 5 can be regulated depending on the speed of the rotatable shaft 1. Therefore, the volume of the material which is transferred can be controlled freely as desired. Furthermore, the raking vanes 2 can be replaced freely by those of the desired total diameter ranging from large to small diameters depending on the viscosity of the material to be transferred. A better effect may be obtained from the rotatable shaft 1 rotating at a smaller speed rather than at a greater speed. Preferably, the speed of rotation is 100–150 revolutions per minute.

The materials which are used during the blending of feed stocks of printing ink are provided usually in the forms such as a dense and viscous liquid, suspension of a low viscosity (a high concentration of powder in a solvent) and a viscous suspended paste. Rarely, they include powder and molten materials. Of these materials having the foregoing forms, viscous liquids and suspensions of a low viscosity mostly may permit "layout" by relying on known transferring means. However, this is almost impossible with the highly concentrated viscous suspended paste. By the use of the apparatus of the present invention, however, it is easy to accomplish the transfer of materials having a viscosity in the range of 2,000–10,000 poise for which it has been impossible to perform "layout" in the past. For example, it is possible to transfer such materials as the substance FD which is a diluent for printing ink, flash base of printing ink and gel compound which is an additive for printing ink. Not only those substances relating to printing ink, but also coal tar (100,000 poise), leaven (20,000 poise), putty (5,000 poise), and other materials such as millet jelly can be transferred easily also.

EXAMPLE 1

An ultra-high dense and viscous material which is called FD (whose components consist of 40 percent by weight of white lead and 60 percent by weight of resinous varnish, which is used as a diluent for printing ink) having an apparent viscosity of 20,000 poise and a yield value of 10,000 dyn/cm$^2$ at 25° C is transferred with no difficulty by the use of the apparatus of the present invention.

EXAMPLE 2

A ultra-high viscous material which is a flash base of printing ink (whose components consist of 35 percent by weight of pigment and 65 percent by weight of resinous varnish) and which has an apparent viscosity of 10,000–20,000 poise and yield value of 5,000–15,000 dyn/cm$^2$ at 25° C is easily transferred by the use of the apparatus of the present invention.

EXAMPLE 3

A material which is a gel compound consisting of 100 percent by weight of gelatinated resinous varnish and which is used as an additive for printing ink and which has an apparent viscosity of 10,000 poise, a yield value of 5,000 dyn/cm$^2$ and an elasticity of $10^{-5}$ at 25° C is transferred easily by the use of the apparatus of the present invention.

I claim:

1. An apparatus for transferring a highly viscous material from a container, comprising: an open top container for the viscous material,
   a tubular casing capable of extending vertically of said container and having a closed top, a feed introduction port of an inverted funnel shape providing the bottom portion of said casing and a delivery outlet formed through the side wall of said casing adjacent said top;
   a driven rotatably shaft extending longitudinally of and through said casing with the upper portion of said shaft rotatably extending through said closed top and the lower end of said shaft extending externally of said open port;
   at least one raking vane fixed to the lower end of said shaft at a position extending laterally of said container and adjacent to, but externally of said port and laterally of said casing and having a curved and twisted face for gathering said viscous material toward the base of said raking vane as the latter is rotated;
   a helical guide vane fixed to said shaft within said casing at a position close to and above said raking vane; and
   continuous helical feed vanes fixed to said shaft within said casing and joining said guide vane and extending along said shaft to a position close to said closed top.

* * * * *